United States Patent [19]
Baril et al.

[11] Patent Number: 5,331,684
[45] Date of Patent: Jul. 26, 1994

[54] HELMET MOUNTING FOR NIGHT VISION ASSEMBLY

[75] Inventors: Albert M. Baril, Roanoke; Roy H. Holmes, Salem, both of Va.

[73] Assignee: ITT Corporation, New York, N.Y.

[21] Appl. No.: 18,117

[22] Filed: Feb. 17, 1993

[51] Int. Cl.$^5$ ............ A42B 3/00; A42B 1/24; G02B 23/00
[52] U.S. Cl. .................. 2/6.2; 2/6.7; 2/422; 359/409
[58] Field of Search ............ 2/6, 422, 410, 421, 2/6.2, 6.6, 6.7; 359/409, 815, 407

[56] References Cited

U.S. PATENT DOCUMENTS

| | | | |
|---|---|---|---|
| 3,889,190 | 6/1975 | Palmer | 2/422 X |
| 4,689,834 | 9/1987 | McCarthy et al. | 2/422 |
| 4,953,963 | 9/1990 | Miller | 359/409 |
| 4,987,608 | 1/1991 | Cobb | 2/6 |
| 5,176,342 | 1/1993 | Schmidt et al. | 244/122 |

FOREIGN PATENT DOCUMENTS

| | | |
|---|---|---|
| 2144558A | 3/1985 | United Kingdom . |
| 2195187A | 3/1988 | United Kingdom . |
| WO850043 | 1/1985 | World Int. Prop. O. . |
| WO890400 | 5/1989 | World Int. Prop. O. . |

*Primary Examiner*—Peter Nerbun
*Attorney, Agent, or Firm*—Arthur L. Plevy; Patrick M. Hogan

[57] ABSTRACT

The present invention is a mounting assembly for mounting a night vision apparatus onto a standard army issue helmet. The present invention includes a support member for retaining the night vision apparatus and a clamping assembly used to join the support member to the helmet. The clamping assembly is removably attachable to a standard army issue helmet above the eyes of the wearer. The support member is pivotably connected to the clamping assembly in a manner that enables the support member to be pivotably rotated about the clamping assembly between an operational position and a stowed position. At the operational position, the support member retains the night vision apparatus in front of the eyes of the wearer. At the stowed position, the night vision apparatus is "flipped up" to a position above the field of view of the wearer, where the night vision apparatus can be retained until again needed. A moveable magnet and an associated reed switch serves to deactivate the night vision device in the stowed position and enable activation of the night vision device in the operational position.

14 Claims, 7 Drawing Sheets

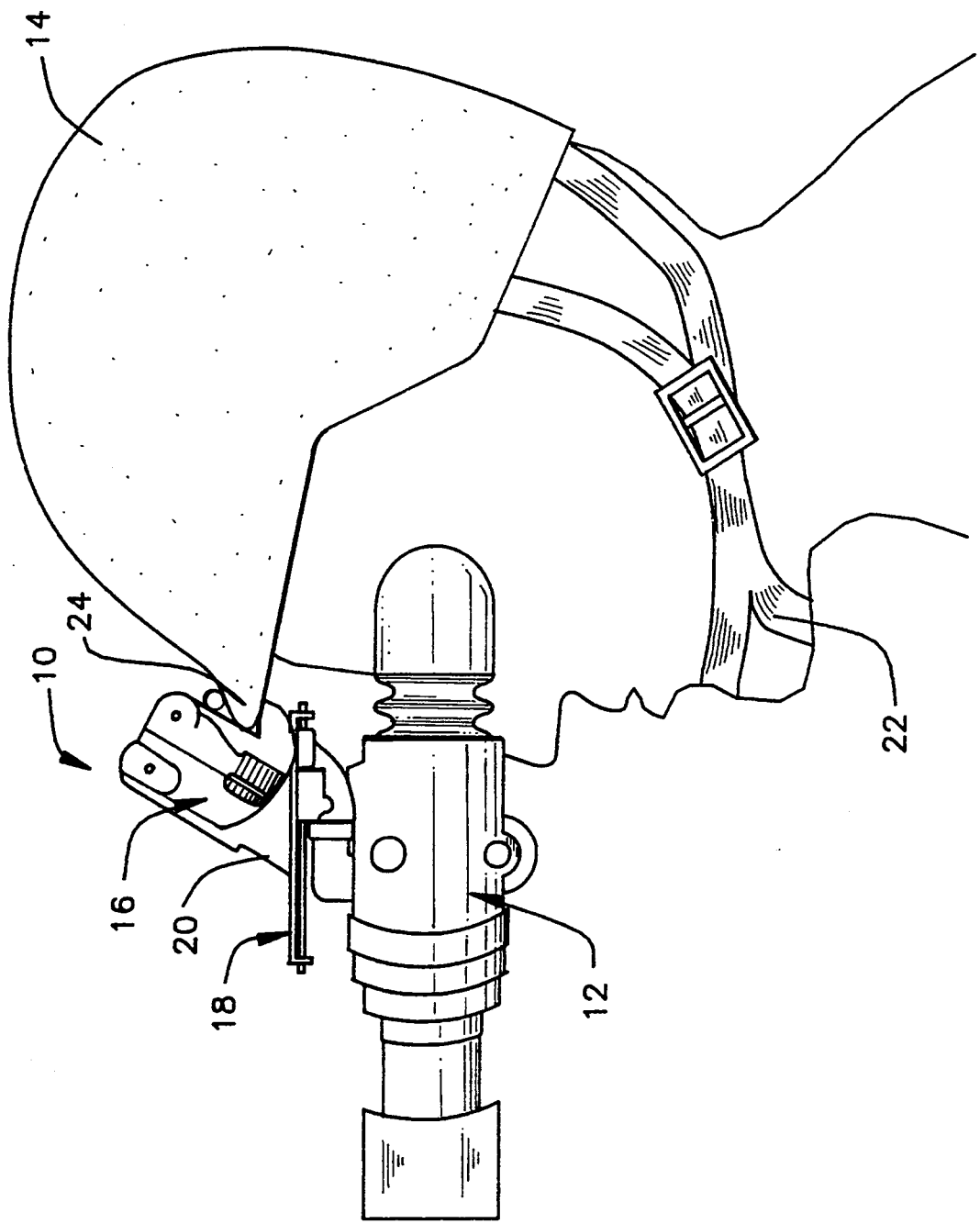

HELMET MOUNTING FOR NIGHT VISION ASSEMBLY

FIELD OF THE INVENTION

The present invention relates to mounting assemblies for supporting a night vision device on a standard army issue helmet, wherein the night vision device can be selectively positioned in front of the eyes of a soldier, or "flipped up" to a point above the field of view of the soldier when not in use.

BACKGROUND OF THE INVENTION

Night vision devices are an important part of a soldier's equipment, allowing the soldier to see during low light or night conditions. Night vision devices utilized by the military typically include image intensifier tubes and associated optics that convert infrared and near infrared light into viewable images. A common night vision device currently being used in the U.S. Army is the PVS-7B night vision goggle assembly. Such goggle assemblies are currently being manufactured by ITT Electro-Optical Products Division of Roanoke, Va., the assignee herein. Although the PVS-7B night vision goggle assembly is commonly used by military personnel there is no available system or assembly in the U.S. Army supply network that directly attaches a pair of PVS-7B night vision goggles to the standard army issued PAS helmet that is worn by most soldiers.

The existing method of carrying the PVS-7B night vision goggle assembly is through the use of a headmount assembly (Part No. 300070-2) which attaches over the soldier's head with various straps, buckles and elastic bands. This prior art headmount assembly is fixed in size and is adjustable only through an elastic band at the back of the soldier's neck, that allows for about a one inch adjustment range. Since the unstretched circumference of the headband assembly comfortably fits only a narrow range of head sizes, anyone with a smaller head finds it difficult to wear the assembly without the addition of some padding to take up the slack. The addition of the padding requires additional time and expense. Adversely, soldier's that have a head size larger than the stretched circumference of the headband assembly, would experience a constricting pressure. Consequently, the headband assembly becomes very uncomfortable and can be worn only for short periods of time.

Compounding the above problem is the further use of straps that accompany the headband assembly. The arrangement of straps used by the prior art headband assembly are cumbersome and uncomfortable. The straps of the prior art headband assembly directly contact the head of the soldier causing discomfort. Furthermore, the weight and center of gravity of the PVS-7B night vision goggle assembly is not compensated for by the straps of the headmount assembly. As such, the night vision goggle assembly often moves out of place and must be continually adjusted and repositioned by the soldier.

In the prior art, mounting assemblies have been disclosed that mount various night vision devices to different types of helmets. Such prior art devices are exemplified by U.S. Pat. No. 4,449,787 to Burbo, et al., entitled NIGHT VISION IMAGING SYSTEM ADAPTED FOR HELMET MOUNTING. Such prior art devices are typically designed for use by an aviator and require a substantial amount of labor to attach or detach the mounting assembly to the helmet. Consequently, such prior art devices are not adaptable for field combat use where it is necessary to quickly detach and store the night vision assembly when not needed.

It is an object of the present invention to provide a mounting assembly that can be used to mount a night vision device directly to a helmet, wherein the mounting device can be quickly and easily attached to, or removed from, the helmet as desired.

SUMMARY OF THE INVENTION

The present invention is a mounting assembly for mounting a night vision apparatus onto a standard army issue helmet. The present invention includes a support member for retaining the night vision apparatus and a clamping assembly used to join the support member to the helmet. The clamping assembly is removably attachable to a standard army issue helmet above the eyes of the wearer. The support member is pivotably connected to the clamping assembly in a manner that enables the support member to be pivotably rotated about the clamping assembly between an operational position and a stowed position. At the operational position, the support member retains the night vision apparatus in front of the eyes of the wearer. At the stowed position, the night vision apparatus is "flipped up" to a position above the field of view of the wearer, where the night vision apparatus can be retained until again needed.

A locking device retains the night vision apparatus at the stowed position, thereby preventing the night vision apparatus from inadvertently rotating back down over the eyes of the wearer. The present invention mounting assembly further includes a slide adjustment at the point where the support member engages the night vision apparatus. The slide adjustment allows for the positional adjustment of the night vision apparatus relative the wearer's eyes when the night vision apparatus is held at the operational position. The mounting assembly also includes a magnet that moves back and forth within an enclosure as the support member is moved between the stowed position and the operational position. The movement of the magnet affects a reed switch, contained within the night vision apparatus, in such a manner that the night vision apparatus is automatically disabled as the night vision apparatus is moved from the operational position to the stowed position. Consequently, the light generated by the night vision apparatus does not shine on the wearer as the apparatus is moved between positions.

The clamping assembly, anchoring the mounting assembly to the helmet, is shaped to conform to the contours of the helmet proximate its forward most brim. The clamping device passes across both sides of the brim and engages the helmet along both its inside surface and its outside surface. The points of engagement along the inside of the helmet are static. However, points of engagement on the outside of the helmet are moveable and can be biased against the helmet, to provide a clamping action. Since the mounting assembly clamps onto the helmet, the helmet does not need to be modified and the mounting assembly can be used by the soldiers in the field in conjunction with the standard issue night vision apparatuses and the helmets.

BRIEF DESCRIPTION OF THE DRAWINGS

For a better understanding of the present invention, reference is made to the following description of an exemplary embodiment thereof, considered in conjunction with the accompanying drawings, in which:

FIG. 1a is a side view of one preferred embodiment of the present invention mounting assembly shown in conjunction with a PVS-7B night vision device and a standard army issue helmet to facilitate consideration and discussion;

DETAILED DESCRIPTION OF THE INVENTION

Figure 1B:
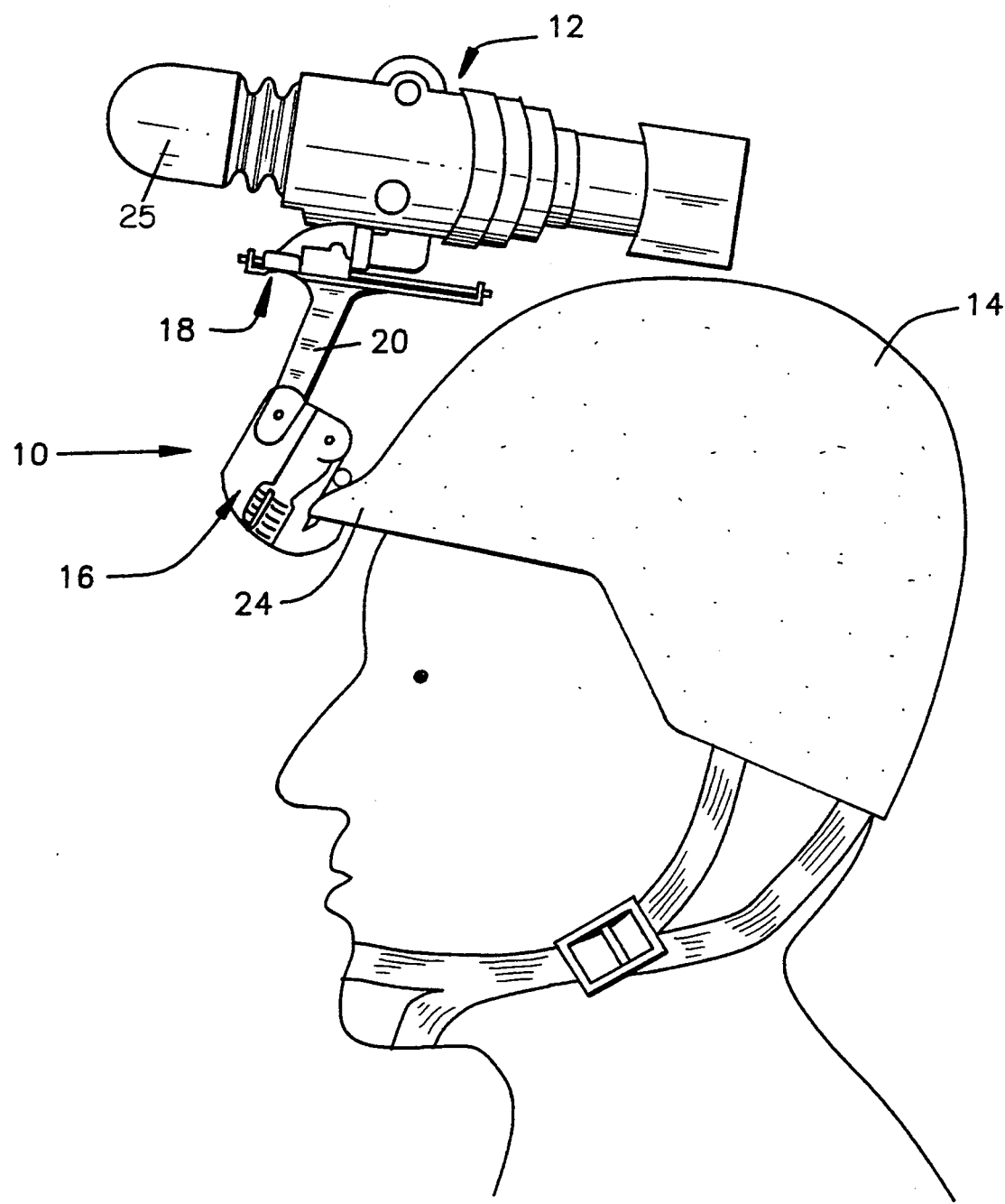
FIG. 1b is the same view of FIG. 1a with the PVS-7B night vision device being shown in its stowed position.

Referring to FIGS. 1a and 1b, the present invention mounting assembly 10 is shown joining a PVS-7B night vision device 12 to a standard army issue PASGT infantry helmet 14. The mounting assembly 10 is comprised of a base clamp assembly 16 which can be selectively attached to the helmet 14, a slide assembly 18 which can be selectively attached to the PVS-7B night vision device 12 and an elongated arm 20 that pivotably interconnects the slide assembly 18 to the base clamp assembly 16.

FIG. 1a shows the present invention mounting assembly 10 at its operational position where the night vision device 12 is held in front of the eyes of a soldier. The weight of the night vision device 12 is supported by the brim of the helmet 14 via the base clamp assembly 16. Consequently, the weight of the night vision device 12 is distributed across the soldier's head by the helmet 14 and is held onto the head of the soldier by the various strapping 22 that is conventionally used to secure the helmet 14. As such, the vertical position of the night vision assembly 12 relative the eyes of the soldier can be adjusted by adjusting the position of the helmet 14 on the soldier's head. As will be later explained, the horizontal distance of the night vision device 12 from the eyes of the pilot can be adjusted by manipulating the slide assembly 18, which joins the night vision device 12 to the base clamp assembly 16.

In FIG. 1b, the night vision device 12 is shown in its stowed position where the night vision device 12 has been rotated relative the base clamp assembly 16 to a point above the brim 24 of the helmet 14. The slide assembly 18 that engages the night vision device 12 is joined to the base clamp assembly 16 by the elongated arm 20. The elongated arm 20 pivots on the base clamp assembly 16, thereby allowing the night vision device 12 to be selectively moved between its operational position and its stowed position. As will later be explained, the base clamp assembly 16 includes a locking means for selectively engaging the elongated arm 20 and holding the night vision device in either its operational or stowed position. Furthermore, as the night vision device 12 is rotated from its operational position to its stowed position, the eyepiece assembly 25 of the night vision device 12 is turned away from the soldier. As will later be explained, the present invention mounting assembly 10 also includes an automatic disabling means that turns off the night vision device 12 as it is rotated from its operational position to its stowed position. As such, the night vision device 12 is prevented from shining light onto the body of the soldier as the eyepiece assembly 25 is moved away from the soldier.

Figure 2:
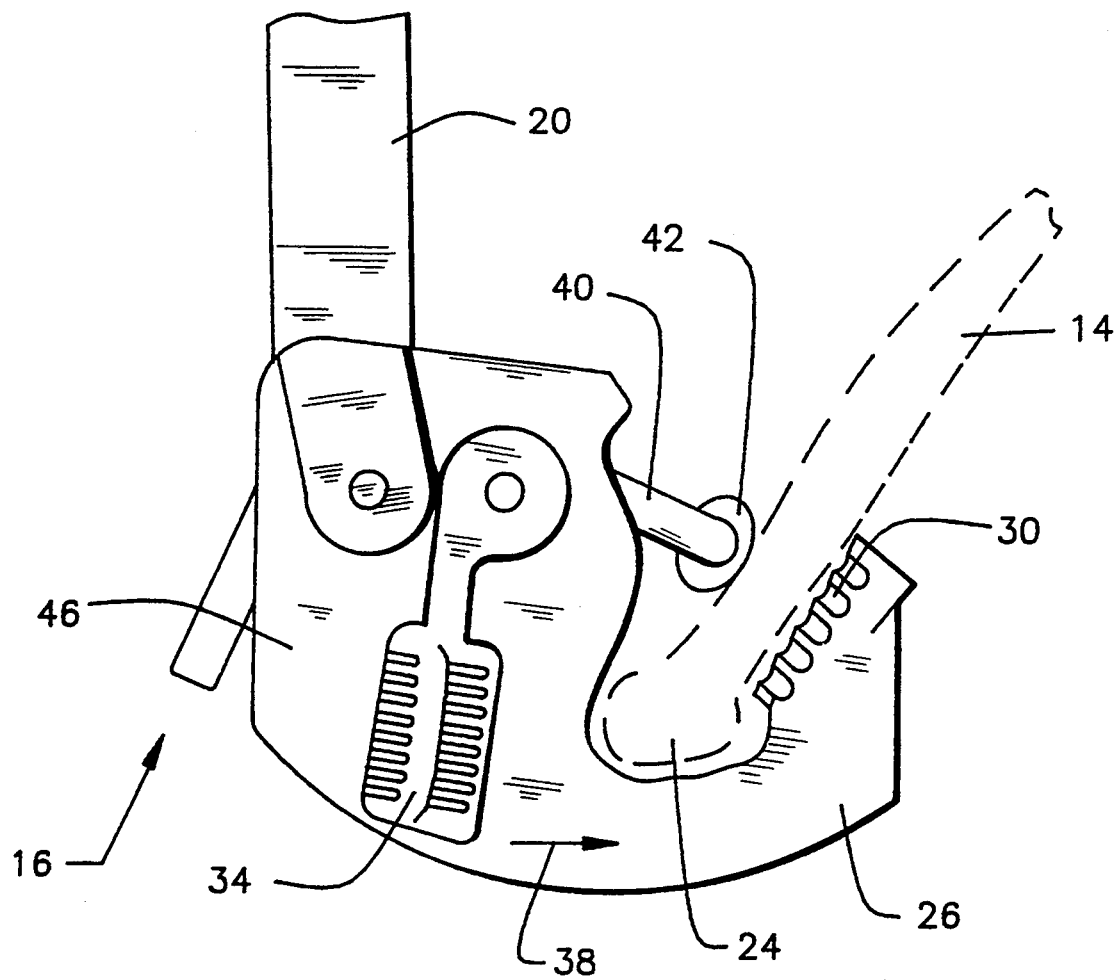
FIG. 2 is a selective side view of the base of the present invention mounting assembly.

Referring to FIG. 2, it can be seen that the base clamp assembly 16 has a generally J-shaped profile that is shaped to accept the narrow brim 24 of the army issue helmet 14. As will be later explained, the base clamp assembly 16 has two protruding legs 26, 28 (See FIG. 3) that terminate with inwardly facing serrated surfaces 30, 32. When the brim 24 of the helmet 14 is placed within the base clamp assembly 16, the serrated surfaces 30, 32 contact the inside surface of the helmet 14. A lever 34 is then moved in the direction of arrow 38. The lever 34 rotates pivot arm 40, which in turn causes a plurality of rollers 42 to engage the helmet 14 and press the helmet 14 against the serrated surfaces 30, 32. The force of the rollers 42 pressing the helmet 14 against the serrated surfaces 30, 32 creates a clamping action that selectively secures the base clamp assembly 16 to the helmet 14. To remove the base clamp assembly 16 from the helmet 14, the lever 34 is rotated in a direction opposite arrow 38. The rotation of the lever 34 causes the rollers 42 to move away from the helmet 14, thereby removing the clamping action.

Figure 3:
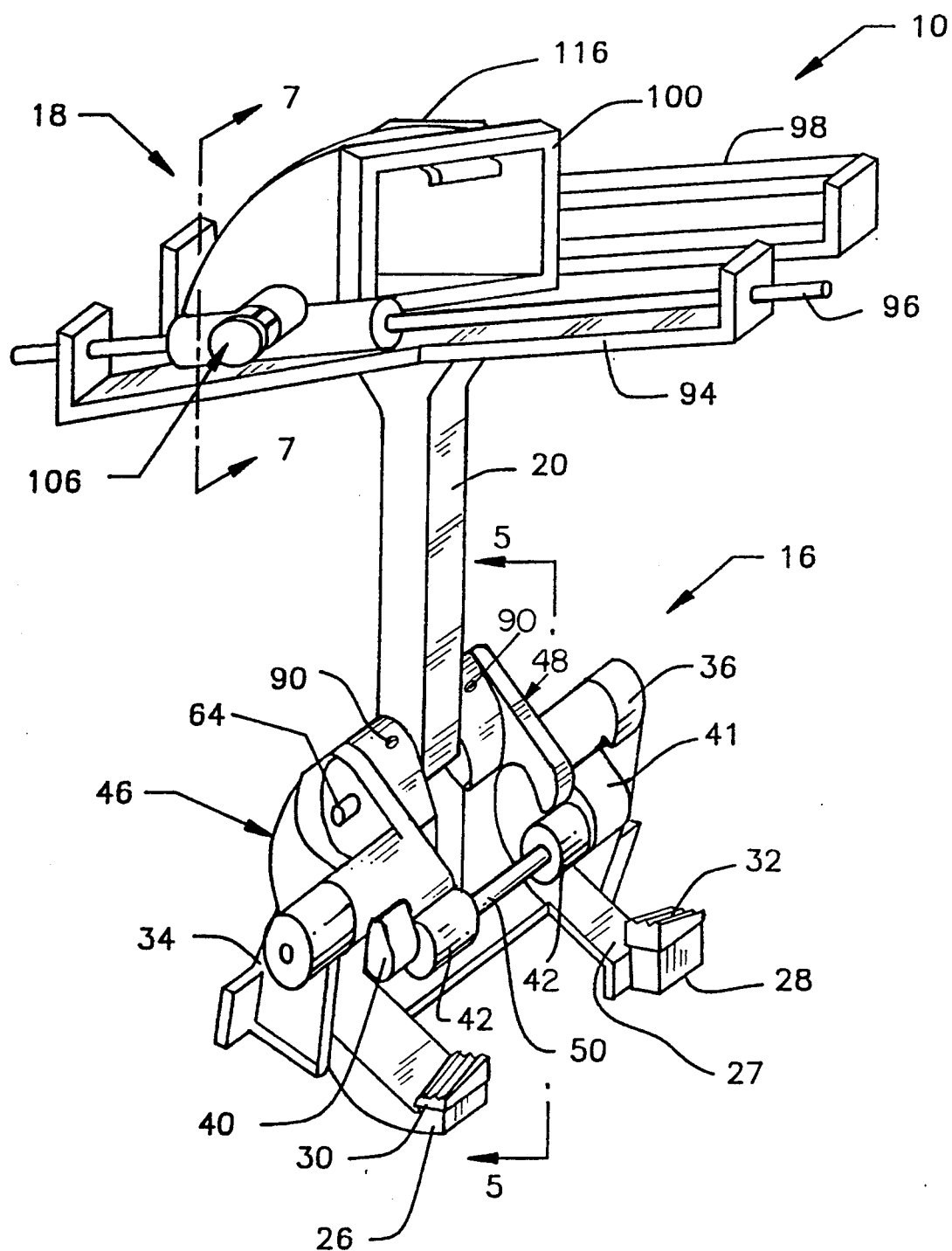
FIG. 3 is a perspective view of a preferred embodiment of the present invention mounting assembly.
Figure 4:
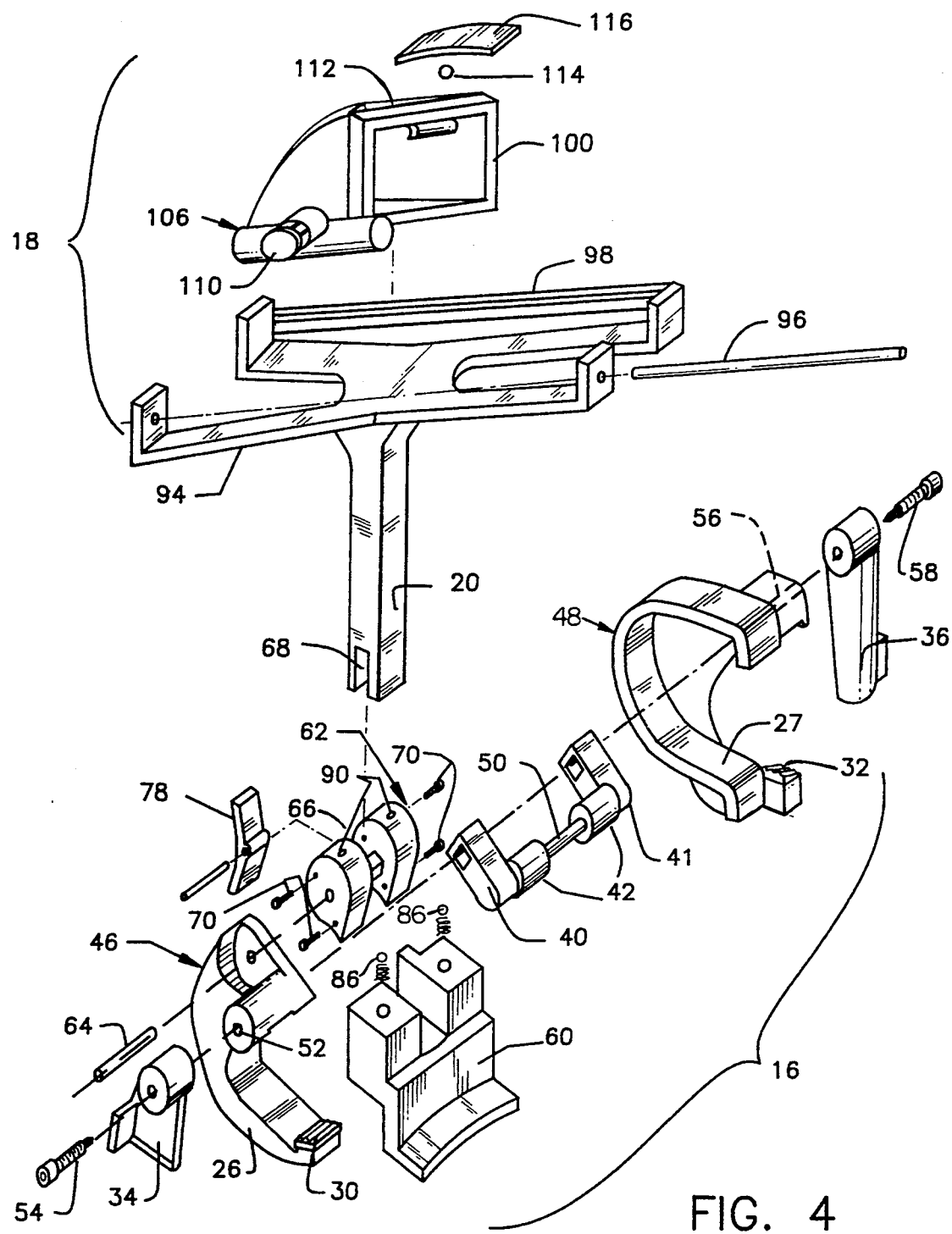
FIG. 4 is an exploded view of the embodiment shown in FIG. 3.

Referring to FIGS. 3 and 4, it can be seen that the base clamp assembly 16 is comprised of a left side member 46 and a right side member 48, wherein the left side member 46 includes the left protruding leg 26 and the left serrated surface 30 shown in FIG. 2. It will therefore be understood that the right side member 48 is symmetrically formed and includes a right protruding leg 27 and a right serrated surface 32 so as to be a mirror image of the left side member 46. The left and right serrated surfaces 30, 32 are sloped in opposite directions, thereby allowing each of the serrated surfaces 30, 32 to conform to the curvature of the helmet they will eventually engage.

The rollers 42 that clamp the helmet against the left and right serrated surfaces 30, 32 are disposed along a shaft 50. A left pivot arm 40 and a right pivot arm 41 are joined to the left and right ends of the shaft 50, respectively. An aperture 52 (FIG. 4) is formed through the left side member 46. A pivot pin 54 passes through the left lever 34, joining the left lever 34 to the left pivot arm 40 through the aperture 52 on the left side member 46. Similarly, an aperture 56 is formed through the right side member 48. A pivot pin 58 passes through the right lever 36, joining the right lever 36 to the right pivot arm 41 through the aperture 56 on the right side member 48. The left and right levers 34, 36, the left and right pivot arms 40, 41 and the two pivot pins 54, 58 are all keyed in a manner that prevents the independent rotation of any element. As such, if either the left or right levers 34, 36 are rotated, both the left and right pivot arms 40, 41 will rotate, as will the opposite lever. Consequently, to engage a soldier's helmet, the helmet is placed within the depression in the protruding legs 26, 27 of the left and right side members 46, 48. The left or the right lever 34, 36 is then rotated, causing the left and right pivot arms 40, 41 to rotate. The left and right pivot arms 40, 41 move the shared shaft 50, which in turn presses the rollers 42 against the helmet and clamps the overall base clamp assembly 16 to the helmet.

A spacer block 60 is disposed between the left and right side members 46, 48. The spacer block 60 can be joined to the left and right side members 46, 48 in any conventional manner, such as with an adhesive or with mechanical fasteners (not shown). A hinge member 62 is disposed between the left and right size members 46, 48 above the spacer block 60. A shaft 64 passes through the center of the hinge member 62, joining the hinge member 62 to both the left side member 46 and the right side member 48. As such, the hinge member 62 is free to rotate around shaft 64 in between the left and right side members 46, 48. A slotted region 66 is disposed in the center of the hinge member 62. A slot 68 is formed at the bottom of the elongated arm 20, thereby allowing the bottom of the elongated arm 20 to enter the slotted region 66 and positively engage the hinge member 62. The elongated arm 20 is affixed to the hinge member 64 in any conventional manner, such as through the use of mechanical fasteners 70, as is shown. With the elongated arm 20 coupled to the hinge member 62, the elongated arm 20 rotates with the hinge member 62 around shaft 64.

Figure 5:
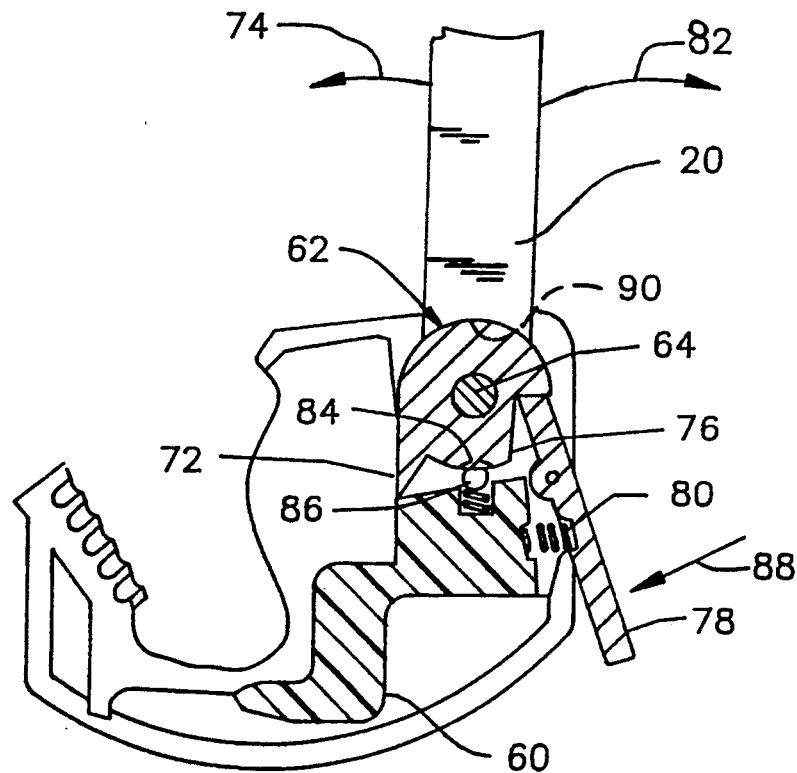
FIG. 5 is a selective cross-sectional view of the embodiment shown in FIG. 3, viewed along section line 5—5.

Referring to FIG. 5, in conjunction with FIG. 4, it can be seen that the hinge member 62 includes at least one salient point 72 that contacts the spacer block 60 when the elongated arm 20 is near a vertical orientation. The contact of the salient point 72 against the spacer block 60 limits the range in which the hinge member 62 can rotate around shaft 64. As such, the elongated arm 20 is prevented from rotating beyond the shown position in the direction of arrow 74. A groove 76 is also formed as part of the hinge member 62. As the salient point 72 of the hinge member 62 contacts the spacer block 60, a locking lever 78 enters the groove 76. The locking lever 78 is pivotably connected to the spacer block 60 and is biased against the hinge member 62 by a spring 80. The presence of the locking lever 78 in the groove 76 on the hinge member 62, interferes with the ability of the hinge member 62 to rotate around shaft 64. Consequently, the presence of the locking lever 78 in the groove 76 prevents the elongated arm 20 from rotating in the direction of arrow 82. A first depression 84 is disposed along the outer surface of the hinge member 62. A locking ball 86, disposed along the top surface of the spacer block 76, engages the first depression 84 as the hinge member 62 is rotated into the shown stowed position. Consequently, when the hinge member 62 is rotated into the stowed position shown in FIG. 5, the elongated arm 20 becomes locked into one set position. At this stowed position, the rotation of the elongated arm 20 in the direction of arrow 74 is prevented by the contact of the salient point 72 of the hinge member 62 against the spacer block 60. The rotation of the elongated arm 20 in the direction of arrow 84 is prevented by the presence of the locking lever 78 in the groove 76 of the hinge member 62. Similarly, the rotation of the elongated arm 20 in both directions is further impaired by the presence of the locking ball 86 in the first depression 84 on the hinge member 62.

When the elongated arm 20 is locked into the near vertical position as is described above, the night vision device the elongated arm 20 supports is held at a stowed position above the brim 24 of a soldier's helmet. To move the night vision device into an operational position, the locking lever 78 is depressed in the direction of arrow 88. Such a manipulation causes the locking lever 78 to pivot out of the groove 76 on the hinge member 62. The elongated arm 20 can then be rotated in the direction of arrow 82. The engagement of the locking ball 86 within the first depression 84 of the hinge member 62 prevents the elongated arm 20 from rotating out of position the instant the locking lever 78 is engaged. Consequently, the elongated arm 20 must be manipulated with sufficient force to displace the locking ball 86 out of the first depression 84 on the hinge member 62.

Figure 6:
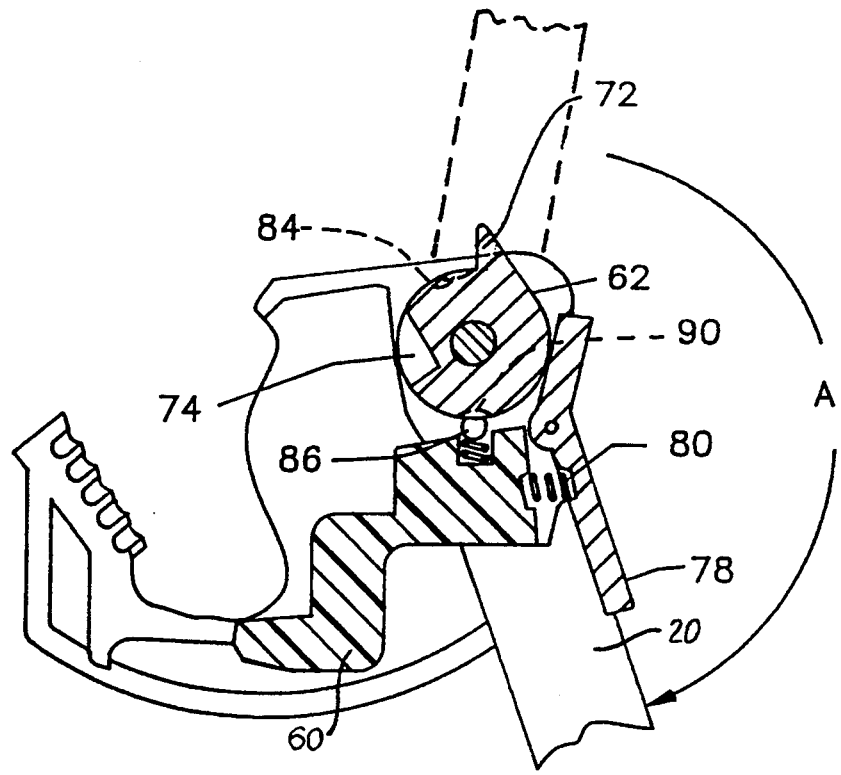
FIG. 6 is a selective cross-sectional view of the embodiment of FIG. 5 shown in its operational position.

Referring to FIG. 6, the elongated arm 20 is shown rotated into its operational position where the elongated arm 20 would support a night vision device in front of the eyes of a soldier, as depicted in FIG. 1a. As can be seen, the elongated arm 20 has been rotated across arc A from the stowed position previously described to its operational position. At this operational position, the locking ball 86 extending from the top surface of the spacer block 60 engages a second depression 90. The presence of the locking ball 86 in the second depression 90 retains the elongated arm 20 at the operational position until the elongated arm 20 is manipulated in the direction of arrow 92 back toward the stowed position with enough force to displace the locking ball 86 from the second depression 90. The elongated arm 20 is prevented from rotating beyond the shown operational position in the direction opposite arrow 92 by the contact of the elongated arm 20 against the center of the spacer block 60.

Figure 7:
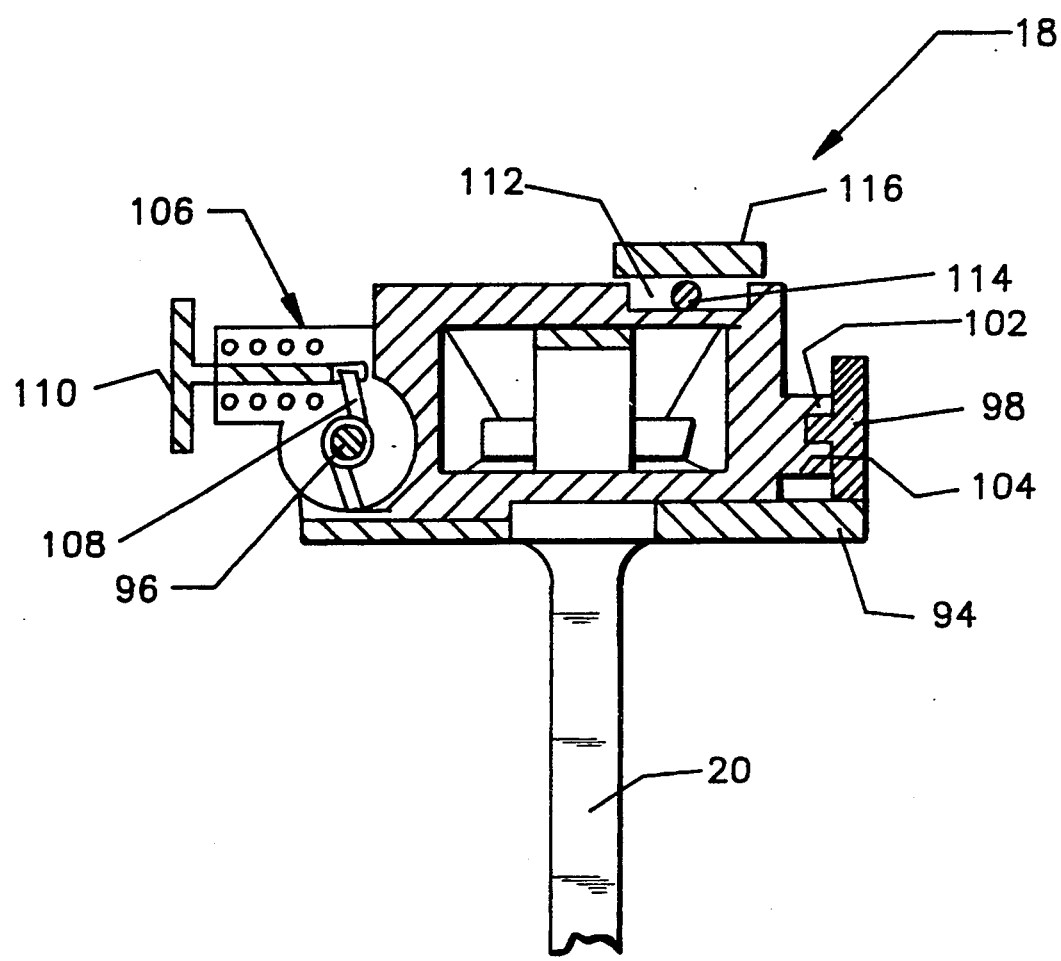
FIG. 7 is a selective cross-sectional view of the embodiment of FIG. 3, viewed along section line 7—7.

Referring to FIG. 7, in conjunction with FIGS. 3 and 4, it can be seen that a slide assembly 18 is affixed to the elongated arm 20, opposite the base clamp assembly 16. The slide assembly 18 engages the night vision device joining the night vision device to the present invention mounting assembly. The slide assembly 18 is comprised of an enlarged platform 94 that supports a shaft 96 along one side and a guide wall 98 along an opposing side. A connector 100 adapted to receive and retain the night vision device is positioned upon the platform 94. A slotted channel 102 is formed on one side of the connector 100. The slotted channel 102 engages and is guided in its reciprocal movement by a tenon member 104 that extends from the guide wall 98. A slide lock mechanism 106 is formed on the side of the connector 100 opposite the slotted channel 102. The slide lock mechanism 106 has a central orifice disposed through its center through which the shaft 96 passes. As such, the reciprocal movement of the connector 100 across the platform 94 is guided on one side by the slide lock mechanism 106 that engages the shaft 96, and the slotted channel 102 on the opposite side that engages the tenon member 104. The slide lock mechanism 106 locks the connector 100 into a desired location along the shaft 96. The slide lock mechanism 106 can be any known locking assembly, such as a threaded fastener that directly engages the shaft 96. However, in the preferred embodiment, the slide lock mechanism 106 includes a torsion spring 108 that is tightly wound around the shaft 96. The tension of the torsion spring 108 can be relieved by engaging a push button 110. The push button 110 selectively relieves the torsion spring 108 causing the torsion spring 108 to disengage the shaft 96 and thereby allowing the overall connector 100 to be positioned as desired along the shaft 96.

The top surface of the connector 100 is curved. A groove 112 is formed along the top surface of the connector 100 following the curvature of the connector 100. A round magnet 114 is placed within the groove 112 and sealed within the groove 112 by a cap 116. As such, the magnet 114 is free to move within the groove 112 as the overall assembly is manipulated.

In the preferred embodiment, the present invention mounting assembly is used to join a PVS-7B night vision assembly to a standard issue army helmet. Certain PVS-7B night vision devices include reed switches that would lay proximate the cap 116 on the connector 110, as the night vision device is joined to the connector 100. When the night vision device is held at its operational position in front of the eyes of a soldier (as shown in FIG. 1a) the magnet 114 travels to a point within the groove 112 that enables the reed switch within the night vision device. When the night vision device is "flipped up" to its stowed position (as shown in FIG. 1b), the magnet 114 falls away from the area of the reed switch and automatically disables the night vision device. This disables the light which is normally emitted from the night vision device from illuminating the wearer while the night vision device is being "flipped up" into the stowed position from its operational position.

It will be understood that the present invention night vision device mounting assembly described herein is merely exemplary and that a person skilled in the art may make many variations and modifications to the described embodiment utilizing functionally equivalent components to those described. All such variations and modifications are intended to be included within the scope of this invention as defined by the appended claims.

What is claimed is:

1. A mounting device for selectively mounting a night vision apparatus to a helmet, the helmet having an interior surface, an exterior surface and a peripheral edge, said mounting device comprising:

support means for supporting the night vision apparatus in a desired orientation;

clamping means, pivotably coupled to said support means, for selectively clamping onto the peripheral edge of the helmet above the eyes of a wearer, said clamping means including engaging means for engaging the interior surface and the exterior surface of the helmet with a releasable clamping action, said engaging means including at least one static surface for contacting the interior surface of the helmet and at least one moveable member for engaging the exterior surface of the helmet;

a pivot arm having a first end and a second end, said at least one moveable member being coupled to said first end of said pivot arm;

at least one lever having an end, said second end of said pivot arm being coupled to said end of said at least one lever, wherein movement of said lever in a first direction increases the clamping pressure provided by said at least one moveable member and said at least one static surface, and wherein movement of said lever in a second direction decreases the clamping pressure provided by said at least one moveable member and said at least one static surface, wherein said support means can be pivotably rotated about said clamping means to an operating position where the night vision apparatus is held in front of the eyes of the wearer, and a stowed position, wherein the night vision apparatus is held above the wearer's field of view; and locking means for selectively locking said support means in said stowed position.

2. The device according to claim 1, further including an adjustment means for adjusting the distance between the night vision apparatus and the eyes of the wearer when said support means is at said operational position.

3. The device according to claim 1, further including a stopping means for stopping said support means from pivotably rotating beyond said stowed position from said operational position.

4. The device according to claim 1, further including a retaining means for selectively retaining said support means at said operational position, thereby preventing any inadvertent movement of said support means away from said operational position.

5. The device according to claim 1, further including a disabling means for automatically disabling the night vision apparatus when said support means is moved away from said operational position.

6. The device according to claim 1, wherein said at least one static surface generally conforms to the shape of said interior surface of the helmet that said static surface engages.

7. The device according to claim 1, wherein said clamping means selectively clamps onto the helmet in a releasable and non-destructive manner, whereby said clamping means engages the helmet without requiring any modifications to the helmet.

8. The device according to claim 1, wherein said support means includes a connector for engaging and retaining the night vision apparatus and a elongated arm coupled to said connector, whereby said elongated arm is pivotably connected to said clamping means, thereby enabling the night vision apparatus to be pivotably rotated between said stowed position and said operating position.

9. The device according to claim 1, wherein said connector is positionally adjustable relative said elongated arm, thereby enabling the distance of the night vision apparatus and the eyes of the wearer to be adjusted when said connector retains the night vision apparatus at said operational position.

10. The device according to claim 9, wherein a magnet is disposed within said connector for enabling the night vision apparatus in said operational position and for disabling the night vision apparatus in said stowed position.

11. The device according to claim 8, wherein said elongated arm is pivotably attached to said clamping means at a hinge member that rotates with said elongated arm between said stowed position and said operational position.

12. The device according to claim 11, wherein said locking means includes a latch that selectively engages said hinge member at said operational position, thereby preventing said hinge member from rotating away from said operational position.

13. The device according to claim 11, wherein said hinge member engages said clamping means when at said stowed position, thereby preventing said hinge member from rotating beyond said stowed position from said operational position.

14. The device according to claim 10, wherein said magnet is free moving within a confined area within said connector, said magnet moving from a first location when the night vision apparatus is at said the operational position, to a second location when the night vision apparatus is at said stowed position, thereby causing the magnet to enable and disable the reed switch when at said operational and said stowed position, respectively.

* * * * *